(12) United States Patent
Dörr et al.

(10) Patent No.: US 11,445,736 B2
(45) Date of Patent: Sep. 20, 2022

(54) CHEWING GUMS AND METHODS FOR THEIR PREPARATION

(71) Applicant: SÜDZUCKER AKTIENGESELLSCHAFT MANNHEIM/OCHSENFURT, Mannheim (DE)

(72) Inventors: Tillmann Dörr, Hohen-Sülzen (DE); Bernd Hasslinger, Carlsberg (DE)

(73) Assignee: SUDZUCKER AKTIENGESELLSCHAFT MANNHEIM/OCHSENFURT, Mannheim (DE)

(*) Notice: Subject to any disclaimer, the term of this patent is extended or adjusted under 35 U.S.C. 154(b) by 722 days.

(21) Appl. No.: 15/033,517

(22) PCT Filed: Oct. 23, 2014

(86) PCT No.: PCT/EP2014/072708
§ 371 (c)(1),
(2) Date: Apr. 29, 2016

(87) PCT Pub. No.: WO2015/062952
PCT Pub. Date: May 7, 2015

(65) Prior Publication Data
US 2016/0270422 A1     Sep. 22, 2016

(30) Foreign Application Priority Data
Oct. 31, 2013    (EP) .................................. 13191119

(51) Int. Cl.
*A23G 4/06*    (2006.01)
*A23G 4/10*    (2006.01)
(Continued)

(52) U.S. Cl.
CPC ............. *A23G 4/062* (2013.01); *A23G 4/025* (2013.01); *A23G 4/08* (2013.01); *A23G 4/10* (2013.01); *A23G 4/20* (2013.01); *A23V 2002/00* (2013.01)

(58) Field of Classification Search
None
See application file for complete search history.

(56) References Cited

U.S. PATENT DOCUMENTS 4,317,838 A * 3/1982 Cherukuri ............... A23G 3/20
                                                        426/291
4,792,453 A * 12/1988 Reed .................... A23G 4/025
                                                        426/302
(Continued)

FOREIGN PATENT DOCUMENTS

EP    0 328 849 B1    8/1989
EP    0 314 739 B1    1/1994
(Continued)

OTHER PUBLICATIONS

Dorr: U.S. Appl. No. 61/736,794, filed Dec. 31, 2012 (Year: 2012).*
(Continued)

*Primary Examiner* — Patricia A George
(74) *Attorney, Agent, or Firm* — Harness, Dickey & Pierce, P.L.C.; Stephen T. Olson (57) ABSTRACT

An improved coated chewing gums and methods for their preparation.

17 Claims, 7 Drawing Sheets

(51) Int. Cl.
*A23G 4/20* (2006.01)
*A23G 4/02* (2006.01)
*A23G 4/08* (2006.01)

(56) References Cited

U.S. PATENT DOCUMENTS

| | | | | |
|---|---|---|---|---|
| 5,458,892 | A | * 10/1995 | Yatka | A23G 4/10 426/3 |
| 6,555,146 | B1 | 4/2003 | Rapp et al. | |
| 2003/0124065 | A1 | * 7/2003 | Majeti | A61K 8/24 424/49 |
| 2008/0255938 | A1 | * 10/2008 | Jani | A23G 4/10 705/14.26 |
| 2009/0208602 | A1 | * 8/2009 | Kowalczyk | A23G 1/32 426/5 |
| 2010/0021508 | A1 | 1/2010 | Hausmanns et al. | |
| 2011/0189376 | A1 | * 8/2011 | Elejalde | A23G 3/42 426/660 |
| 2013/0302387 | A1 | * 11/2013 | Pedersen | A61K 8/58 424/401 |
| 2014/0010768 | A1 | * 1/2014 | Chambers | A23L 2/39 424/58 |

FOREIGN PATENT DOCUMENTS

| | | |
|---|---|---|
| EP | 0 664 674 B1 | 9/1999 |
| JP | H11-507243 A | 6/1999 |
| JP | 2010-534637 | 11/2010 |
| WO | WO 95/08926 A1 | 4/1995 |
| WO | WO 97/08958 A | 3/1997 |
| WO | WO 00/38532 | 7/2000 |
| WO | WO 2007/070061 A1 | 6/2007 |
| WO | WO 2009/015790 A1 | 2/2009 |
| WO | WO 2009/016133 A | 2/2009 |

OTHER PUBLICATIONS

Notice of Reasons for Rejection dated Jun. 27, 2017 in corresponding Japanese Patent Application No. 2016-526770 (with English language translation)(total 5 pages).

International Search Report dated Feb. 18, 2015 issued in corresponding International patent application No. PCT/EP2014/072708.

Written Opinion dated Feb. 18, 2015 issued in corresponding International patent application No. PCT/EP2014/072708.

* cited by examiner

CHEWING GUMS AND METHODS FOR THEIR PREPARATION

CROSS REFERENCE TO RELATED APPLICATIONS

The present application is a 35 U.S.C. § 371 National Phase conversion of PCT/EP2014/072708, filed Oct. 23, 2014, which claims benefit of European Application No. 13191119.0, filed Oct. 31, 2013, the disclosure of which is incorporated herein by reference. The PCT International Application was published in the English language.

The present invention relates to improved coated chewing gums and methods for their preparation.

BACKGROUND OF THE INVENTION

Coated chewing gums, including coated sugarless chewing gums, are primarily composed of a core, sometimes also called a center, and a coating enveloping said core, wherein said coating usually is made up of a number of individual coating layers. Said coatings, mainly composed of at least a sweetener, flavourings and other additives, conventionally provide the chewing gum with a desired optical appearance, nutritional value, taste and/or sensoric behaviour. The chewing gum cores are regularly composed of a gum base, a bulk sweetener, intensive sweeteners, flavourings and a plasticizer such as glycerol and are mainly responsible for the texture and chewing behaviour experienced by the customer.

Conventional processes for the production of sugarless coated chewing gums employ an addition of aqueous liquid or suspended polyols to the chewing gum core followed by drying or, alternatively, employ an addition of aqueous liquid or suspended polyols plus a dry charge with a polyol followed by drying.

EP 0 664 674 B1 and WO 00/38532 disclose various methods for coating chewing gum cores, in particular of sugarless chewing gums. These sugarless chewing gums, in particular when coated with isomalt, are well-known and highly demanded products in the market. They conventionally contain glycerol as a softener or plasticizer in the gum's center. Glycerol is described therein as providing a moisture pulling effect to the gum center. As a result the coating becomes dry, absorbs moisture from the atmosphere and eventually loses its original characteristics and shelf life stability. Due to its preservative function, EP 0 328 849 B1, however, teaches to include glycerol considered to be a humectant in the chewing gum, although it is known to pick up moisture.

On the other hand, it is also well-known from for instance EP 0 314 739 B1, that the coatings of chewing gum cores suffer from a highly undesirable migration of core components, including water, into the coating, resulting in commercially unacceptable products. These products not only lose their initial sensoric and organoleptic qualities but also suffer from a reduced storage, that means shelf life stability.

Thus, all of these products are still characterised by a shelf life stability, which is limited, in particular under humide conditions. Furthermore, there is an increasing number of consumers, which prefer a particular hard coating, in particular a crunchy coating, which need is not properly addressed by the prior art chewing gums.

SUMMARY OF THE INVENTION

The present invention is based on the technical problem to provide coated chewing gums, which overcome the above identified disadvantages, in particular to provide coated chewing gums and processes for obtaining them, which chewing gums have an improved shelf life and an improved hardness, in particular an improved crunch, of its coating.

The present invention solves said problem by the teaching of the independent claims.

In particular, the present invention solves its technical problem by providing coated sugarless chewing gums, which do no contain glycerol, in particular do not contain glycerol in their core.

It is one of the contributions of the present invention to provide a glycerol-free chewing gum, which due to the use of a specific sweetener system exhibits a superior plasticity and texture and functions as sweetener, humectant and plasticizer.

The present invention provides in particular a coated sugar-free and glycerol-free chewing gum, the core of which is characterised by the presence of a particular sweetener system, which essentially consists of, in particular consists of, (1) hydrogenated starch hydrolysate, (2) isomalt particles, (3) sorbitol particles and (4) at least one of a sweetener enhancer and a high intensity sweetener, which sweetener system provides sweetness to the chewing gums and which four components (1) to (4) are present in specific quantitative ratios to each other.

It has surprisingly been discovered that such a sweetener system provides a plasticity and texture to the chewing gum, which perfectly fits the consumers demands and does not cause or support migration of any core elements, e.g. menthol, into the coating, which would lead to an undesired loss of crunch and shelf life stability.

Thus, the present coated sugar- and glycerol-free chewing gums comprising a core and a coating are characterised by a core, which comprises at least one chewing gum base, at least one monoterpene and the specific sweetener system, which essentially consists of, in particular consists of, the above identified four components, which function as plasticizer- and sweetener-system and which in its specific quantitative ratios of ingredients provide a very stable plasticizer- and sweetening-system, which does not adversely effect its surrounding coating, in particular does not pull moisture from the coating into the core and does not cause any undesired migration of any components from the core into the coating.

A specific and beneficial effect of the present invention is, that hardly any or even no migration of the flavouring present in the core, namely the at least one monoterpene, is observed into the coating.

The present invention relates in particular to a coated sugar-free and glycerol-free chewing gum, comprising a core and a coating, wherein the core comprises
  a) at least one chewing gum base,
  b) at least one monoterpene,
  c) a sweetener system consisting of
    c 1) hydrogenated starch hydrolysate,
    c 2) isomalt particles, wherein at least 90 wt.-% of the particles have a particle size less than 100 µm,
    c 3) sorbitol particles and
    c 4) at least one high intensity sweetener and/or a sweetness enhancer,
wherein said sweetener system is the only component present in the core which provides sweetness wherein the wt.-% ratio of the isomalt particles to the at least one monoterpene in the core is from 6:1 to 20:1, of the overall amount of the isomalt particles and the sorbitol particles to the hydrogenated starch hydrolysate in the core is from 4:1 to 6:1 and of the isomalt particles to the sorbitol particles in the core is from 2.2:1 to 2.8:1 (each wt.-% ratio based on total weight)

and wherein the coating comprises at least 80 wt.-% isomalt (based on dry substance of the coating).

According to the present invention, the chewing gum provided in the present invention is sugar-free, in particular free of sucrose, free of glucose, free of lactose and free of fructose and free of combinations of these sugars. In the context of the present invention a sugar is not a sugar alcohol.

According to the present invention, the chewing gum core does not—with the exception of said sweetener system—contain any further substance, which provides sweetness to a human consumer.

This teaching, however, does not exclude that the coating of the chewing gum core enveloping the core may contain one or more sweeteners. Thus, in one embodiment of the present invention, the coating of the sugar- and glycerol-free chewing gums of the present invention are coatings, which contain at least one sugarless sweetener, in particular a polyol, preferably a sugar alcohol, such as isomalt or an intensive sweetener or a combination thereof.

However, it is also an embodiment of the present invention to provide a coated sugar- and glycerol-free chewing gum, which does not contain any sweetener in the coating.

In the context of the present invention, the term "sweetener" refers to a substance providing sweetness to a consumer, in particular a human consumer. Such a "sweetener" may be a bulk sweetener, which provides a feeling of body and sweetness to the consumer, wherein the feeling of body refers to the sensation of a particular texture and physical presence of said sweetener in the mouth of the consumer. A bulk sweetener according to the present invention may be a polyol, in particular a sugar alcohol, preferably a disaccharide alcohol, preferably isomalt.

Alternatively, a "sweetener" may also be an intensive sweetener, which solely provides sweetness, but does not provide a feeling of body to the consumer. Intensive sweeteners are used, due to their high sweetening power, in tiny amounts.

In the context of the present invention, the terms "component, which provides sweetness" or "sweetening component" are meaning a "sweetener".

In the context of the present invention, the term "sweetener system is the only component present in the core, which provides sweetness", is meant to refer to the specific function of the above identified sweetener system, composed of components c1) to c4), which provides in its entirety sweetness, in particular the sensation of a bulk sweetener, to the overall chewing gum and wherein no further sweetening component is present in the core. However, as indicated before, the term is not meant to exclude the presence of other sweetener components in the coating of the chewing gum, which is an optional embodiment of the present teaching.

In the context of the present invention, the term "overall amount of the isomalt particles and the sorbitol particles" is meant to refer to the added amount of isomalt particles and sorbitol particles, that means the cumulated amount of both particle types.

In the context of the present invention, the term "comprising" preferably has the meaning of "containing" or "including" meaning that the composition in question at least comprises the specifically identified component without excluding the presence of further components. However, in a preferred embodiment the term comprising is also understood to have the meaning of "consisting essentially of" and in a most preferred embodiment of "consisting". The term "consisting essentially of" excludes the presence of substantial amounts of further components except the specifically identified component of the composition. The term "consisting" excludes the presence of any further compound, no matter in which quantity in the composition identified.

In the context of the present invention, the term "comprising essentially" preferably has the meaning that the specifically identified component is the component with the highest proportion in the composition in question compared to the components present in the composition in question. However, in a preferred embodiment the term "comprising essentially" means that the composition in question comprises at least 50% by weight, even more preferably at least 51% by weight of the specifically identified component.

In the context of the present invention, the term "at least one" preferably has the meaning that one component or more than one components, for example two, three or more components are present.

The Gum Base:

In a preferred embodiment of the present invention, the chewing gum base is water insoluble.

In a preferred embodiment of the present invention, the chewing gum base is tooth-friendly.

In a preferred embodiment, the chewing gum base comprises resins, elastomers, fats, oils, waxes and/or inorganic filling substances. The chewing gum base according to the present invention does not contain glycerol.

In a preferred embodiment, the chewing gum base is present in the core in an amount from 10 to 90% by weight of the chewing gum core, preferably from 10 to 50% by weight, most preferably from 20 to 40%, in particular 25 to 35% by weight (each based on total weight) of the chewing gum core.

The Monoterpene:

The present invention requires the presence of at least one monoterpene in the core, which monoterpene is providing a desired flavour to the chewing gum.

In a preferred embodiment of the present invention, the at least one monoterpene is at least one monocyclic monoterpene.

In a preferred embodiment of the present invention, the monocyclic monoterpene is menthol.

In a preferred embodiment of the present invention, the monoterpene is present in the chewing gum in form of corn mint oil, peppermint oil or mint oil.

In a particularly preferred embodiment, the at least one monoterpene is present in the core in an amount from 0.1 to 15% by weight of the chewing gum core, preferably from 0.3 to 6%, most preferably from 0.2 to 5%, in particular 0.5 to 4%, preferably 0.5 to 3%, preferably 0.8 to 1.7% by weight (each based on total weight) of the chewing gum core.

The Sweetener System:

In the context of the present invention the term 'hydrogenated starch hydrolysate' refers to a mixture of several sugar alcohols. Hydrogenated starch hydrolysates are generally produced by partial hydrolysis of starch which creates dextrin such as glucose and short glucose moieties containing chains, which, after said hydrolysis, are hydrogenated to convert the dextrins to sugar alcohols. Since in hydrogenated starch hydrolysate the starch is not completely hydrolysed, hydrogenated starch hydrolysates comprise a mixture of in particular sorbitol, maltitol and longer chain hydrogenated saccharides with a degree of polymerisation (DP) of 2 or more, such as maltotriitol.

The present invention in one embodiment employs hydrogenated starch hydrolysates, wherein no single polyol is dominant. The present invention also relates to hydrogenated starch hydrolysates in which 50 or more % of the polyols in the mixture are of one type, in particular sorbitol or maltitol, and which preferably are maltitol or sorbitol syrups. In any case, the hydrogenated starch hydrolysates do not solely contain sorbitol or solely maltitol and are therefore in particular no pure sorbitol or maltitol syrups, but comprise further components, in particular hydrogenated di- or oligosaccharides, with a degree of polymerization (DP) of two, three of more.

In a further embodiment of the present invention, the hydrogenated starch hydrolysate is sorbitol syrup. In a further embodiment of the present invention, the hydrogenated starch hydrolysate is a mixture of a maltitol and sorbitol syrup. In a further embodiment of the present invention, the hydrogenated starch hydrolysate comprises in addition to maltitol syrup or in addition to sorbitol syrup or in addition to a mixture of maltitol and sorbitol syrup oligosaccharides.

In a preferred embodiment of the present invention, the hydrogenated starch hydrolysate is maltitol syrup, for instance Lycasin®. In a preferred embodiment of the present invention, the maltitol syrup is free of sorbitol.

In a particular embodiment of the present invention, the hydrogenated starch hydrolysate is free of sorbitol and in particular free of sorbitol syrup.

In a particular embodiment of the present invention, the sweetener system does not contain, with the exception of the sorbitol particles, any sorbitol. Thus, in this specific embodiment, the present chewing gum is containing as the only sorbitol component the sorbitol particles identified as components c3).

In a particular embodiment of the present invention, wherein the only sorbitol component in the sweetener system of the present invention are the sorbitol particles identified as components c3) no hydrogenated di- or oligosaccharides, in particular no di- or oligosaccharides with a DP2, DP3 or more, originating from hydrogenating a starch hydrolysate are present.

In a preferred embodiment of the present invention, the hydrogenated starch hydrolysate is present in the core in an amount from 5 to 20, preferably 7 to 18, most preferably 8 to 15, in particular 9 to 13 weight-% (each based on total weight).

The present invention requires to use isomalt particles, wherein at least 90%, preferably at least 92%, preferably at least 95% of the particles have a particle size less than 100 μm, preferably less than 90 μm, most preferably less than 80 μm.

In a further preferred embodiment of the present invention, the isomalt particles have a diameter of at most 1000 μm. More preferably, the particles have a diameter of at most 700, 600, 500, 400, 300, 250, preferably at most 200 μm, most preferably at most 150 μm. The particles can also have a diameter of less than 150 μm, preferably less than 50 μm. Preferably, the particles can have a diameter of at least 50, 60, 70, preferably 80 μm. In a further preferred embodiment of the present invention, the isomalt particles have a diameter of at most 250 μm and of at least 50 μm. In a preferred embodiment the particles have a diameter of at least 50 μm. More preferably, the particles have a diameter of at least 70 μm.

In a further preferred embodiment of the present invention, the isomalt is a milled and agglomerated isomalt, The particle size distribution of isomalt is preferably measured by laser diffraction. More preferably, the particle size is measured by laser diffraction using the Mastersizer 2000, made by MALVERN Instruments. With the aid of laser diffraction measurement, the particle size distribution of Isomalt can be ascertained for quality evaluation. The measuring principle is preferably based on dispersed light/laser diffraction spectroscopy according to ISO 13320. Isolated particles are brought into a laser beam in a low concentration. The particles are introduced by aspirating isomalt into the measuring cell ("dry measurement"). Depending on the diameter of the particles, the laser light is diffracted, which is recorded by detectors as scattered rays. The measuring results are initially extant in the form of the light intensities measured by the detectors and must be converted into a particle size distribution. This occurs by means of the associated evaluation software for the particles given here >1 μm through an approximation by Joseph von Fraunhofer. The dosage of the samples (around 20 g) is preferably carried out using a riddle sieve with channel and adjustable gap width. A fine sieve with several balls is preferably used as a sieve insert. The dosage (gap width) must be set in such a way that the measuring concentration is attained. Air with an overpressure of 2.5 bar can be used as a dispersing medium. A person skilled in the art knows the relevant measuring parameters.

In the context of the present invention, the term "isomalt" preferably means isomalt ST, isomalt GS, an isomalt variant or a component thereof. A specific embodiment of isomalt is also known as Palatinit® or "hydrogenated palatinose".

In a preferred embodiment of the present invention, isomalt is at least one component selected from the group consisting of 1,1-GPS (1-O-α-D-glucopyranosyl-D-sorbitol), 1,1-GPM (1-O-α-D-glucopyranosyl-D-mannitol), 1,6-GPS (6-O-α-D-glucopyranosyl-D-sorbitol), isomalt, isomalt ST, in particular isomalt ST PF, an isomalt variant and isomalt GS.

In a preferred embodiment, isomalt is a mixture of 1,6-GPS and 1,1-GPM, while isomalt ST, also termed an equimolar mixture of 1,6-GPS and 1,1-GPM, is a mixture of 53 to 47% 1,6-GPS and 47 to 53% 1,1-GPM. Isomalt GS is a mixture of 71 to 79% 1,6-GPS and 29 to 21% 1,1-GPM, preferably 75% 1,6-GPS to 25% 1,1-GPM (values given in weight-% on dry matter).

In a further preferred embodiment, isomalt is an isomalt variant. In the context of the present invention, isomalt variants are for instance mixtures of 10 to 50% 1,6-GPS, 2 to 20% 1,1-GPS and 30 to 70% 1,1-GPM or mixtures of 5 to 10% 1,6-GPS, 30 to 40% 1,1-GPS and 45 to 60% 1,1-GPM. Isomalt variants may also be in form of 1,6-GPS or 1,1-GPM enriched mixtures. 1,6-GPS enriched mixtures have an 1,6-GPS amount of 58 to 99% and an 1,1-GPM amount of 42 to 1%. 1,1-GPM enriched mixtures have an 1,6-GPS amount of 1 to 42% and an 1,1-GPM amount of 58 to 99% (values given in weight-% on dry matter).

In a preferred embodiment of the present invention, the isomalt particles are present in the core in an amount from 20 to 60, preferably 25 to 55, preferably 30 to 45, in particular 36 to 44 weight-% (based on dry substance of the core).

In a preferred embodiment of the present invention, the sorbitol particles are crystalline sorbitol particles.

The present invention requires to use sorbitol particles, wherein at least 90%, preferably at least 92%, preferably at least 95% of the particles have a particle size less than 100 μm, preferably less than 90 μm, most preferably less than 80 μm.

In a further preferred embodiment of the present invention, the sorbitol particles have a diameter of at most 1000 µm. More preferably, the particles have a diameter of at most 700, 600, 500, 400, 300, 250, preferably at most 200 µm, most preferably at most 150 µm. The particles can also have a diameter of less than 150 µm, preferably less than 50 µm. Preferably, the particles can have a diameter of at least 50, 60, 70, preferably 80 µm. In a further preferred embodiment of the present invention, the sorbitol particles have a diameter of at most 250 µm and of at least 50 µm. In a preferred embodiment the particles have a diameter of at least 50 µm. More preferably, the particles have a diameter of at least 70 µm.

The particle size distribution of the sorbitol particles is measured as explained above for the determination of the particle size of isomalt.

In a preferred embodiment of the present invention, the sorbitol particles are present in the core in an amount from 9 to 30, preferably 10 to 25, preferably 11 to 19 weight-% (based on dry substance).

In a preferred embodiment of the present invention, the high intensity sweetener is aspartame, acesulfame K, sucralose, saccharine, glycyrrhicine, thaumatin, neohesperidin-dihydrochalkone, cyclamate, a *stevia* extract, steviol glycoside, stevioside, rebaudioside A, monellin, alitame or a combination thereof.

In a preferred embodiment of the present invention, the sweetness enhancer is a substance which—in contrast to a high intensity sweetener—itself has hardly any or no sweetness but which is capable of increasing the sweetness of another sweetening agent.

In a preferred embodiment of the present invention, the sweetness enhancer is not hydrogenated starch hydrolysate which itself has sweetness.

In the context of the present invention, a sweetness enhancer is in particular a substance which increases the sweetness of a 5 weight % sucrose solution by 10 to 30%, in particular up to a sweetness of a 6.5 weight % sucrose solution.

In an optional embodiment, the sweetness enhancer additional provides an effect on the overall taste profile of a product, that means improves for instance the mouth feeling. The sweetness enhancers usually are used only in low doses and increase synergistically the sweetness of another sweetening agent. In the context of the present invention, a sweetness enhancer is not a high intensity sweetener. In the product of the present invention it is possible to use all known sweetness enhancers.

In a particularly preferred embodiment of the present invention a sweetness enhancer is a plant extract. In furthermore preferred embodiment synthetic or artificial sweetness enhancers can be used.

In a preferred embodiment, the at least one high intensity sweetener and/or sweetness enhancer, namely component c4) is present in the core in an amount from 0.01 to 6%, preferably 0.002 to 5%, in a particular from 0.01 to 1%, preferably from 0.05 to 0.5%, most preferably from 0.05 to 0.08% by weight (each based on total weight) of the chewing gum core.

In a furthermore preferred embodiment, the sweetener system is present in the core in an amount from 10 to 90% by weight of the chewing gum core, preferably from 15 to 85 weight-%, preferably 20 to 80 weight-%, preferably 20 to 70 weight-%, most preferably from 30 to 68%, in particular from 40 to 66% by weight (each based on total weight) of the chewing gum core.

In a particularly preferred embodiment, the weight-% ratio (calculated on total weight) of the isomalt particles to the at least one monoterpene is from 7:1 to 20:1, preferably from 7:1 to 14:1, preferably 8:1 to 12:1 and preferably from 12:1 to 14:1.

In a particularly preferred embodiment, the weight-% ratio (calculated on total weight) of the isomalt particles to the at least one monocyclic monoterpene in the core is from 7:1 to 20:1, preferably from 7:1 to 14:1, preferably 8:1 to 12:1 and preferably from 12:1 to 14:1.

In a particularly preferred embodiment of the present invention, the weight-% ratio (calculated on total weight) of the isomalt particles to the at least one monoterpene in form of menthol present in the core is from 7:1 to 20:1, preferably from 7:1 to 14:1, preferably 8:1 to 12:1 and preferably from 12:1 to 14:1.

In a preferred embodiment of the present invention, the wt.-% ratio of the isomalt particles to the sorbitol particles in the core is 2.3:1 to 2.7:1; preferably 2.4:1 to 2.6:1, most preferably 2.5:1 (based on total weight of the core).

The Additives:

In a preferred embodiment of the present invention, the core, the coating or both comprises at least one additive selected from the group consisting of a hydrocolloid, gum arabic, a lubricant, a vitamin, a mineral, a pharmaceutically active ingredient, a preservative, a colour, $TiO_2$ and an edible acid.

In a preferred embodiment of the present invention, the coating of the chewing gum comprises up to 20, preferably 1 to 20, preferably 5 to 15, preferably 7 to 12 weight-% of at least one agent selected from the group consisting of an additive, a flavouring, a high intensity sweetener and a sweetness enhancer (weight-% based on dry substance of the coating).

The Coating:

In a preferred embodiment of the present invention, the coating comprises at least 81, preferably at least 85, in particular at least 90, preferably at least 95, most preferably at least 98 weight-% isomalt (based on dry substance of the coating).

In a preferred embodiment of the present invention, the coating further comprises at least one agent selected from the group consisting of an additive, a flavouring, a high intensity sweetener and a sweetness enhancer.

In a furthermore preferred embodiment of the present invention, the coating is a soft coating or a hard coating.

In a preferred embodiment of the present invention, the coating of the chewing gum comprises 5 to 100, preferably 20 to 80, preferably 30 to 70, in particular 40 to 60 individual coating layers.

In a preferred embodiment of the present invention, the chewing gum comprises 15 to 50, preferably 20 to 45, wt.-% coating and 50 to 85, preferably 55 to 80 wt.-% core (each based on dry substance of the chewing gum).

In a preferred embodiment of the present invention, the coated chewing gum of the present invention comprises in between the core and the coating at least one interlayer. Said interlayer may comprise gum *arabicum* and/or starch, in particular rice starch.

The present invention also provides a method of producing a coated sugar-free and glycerol-free chewing gum, i.e. a chewing gum dragee, according to the present invention comprising the steps of i) providing a chewing gum core, comprising components a) to c), ii) providing a coating medium, in particular a coating solution or coating suspension, comprising, preferably comprising essentially, a solvent and isomalt, preferably including additionally at least one agent selected from the group consisting of an additive, a flavouring, a high intensity sweetener and a sweetener enhancer, iii) applying the coating medium to the chewing gum core so as to obtain at least one, preferably a plurality, of individual coating layer on the core, iv) evaporating the solvent from the at least one coating layer, in particular by drying, and v) obtaining the coated chewing gum, wherein the coating comprises at least 80 weight-% isomalt, preferably isomalt GS (based on dry substance of the coating).

The chewing gum core and the coating medium provided in the above identified method a) are prepared in conventional manners well-known to the skilled artisan. The process for coating of the chewing gum core, the drying and obtaining of the coated chewing gum is also performed in conventional processes well-known to the skilled artisan.

Further preferred embodiments of the present invention are the subject matter of the subclaims.

BRIEF DESCRIPTION OF THE DRAWINGS

The invention is now described by way of the following non-limiting examples.

The figures show.

DESCRIPTION OF PREFERRED EMBODIMENTS

Example 1

Preparation of Chewing Gum Dragees:
A) Recipes of Cores:

TABLE 1

Composition of chewing gum cores (Weight and weight-% based on total weight)

|  | Mannitol Center | Maltitol Center | Isomalt Center | Sorbitol Center |
|---|---|---|---|---|
| Gum Base *Navia* | 30.00% | 30.00% | 30.00% | 30.00% |
| Isomalt ST/PF |  |  | 40.00% |  |
| Sorbitol powder | 15.40% | 15.40% | 15.40% | 55.40% |
| Maltitol powder |  | 40.00% |  |  |
| Mannitol powder | 40.00% |  |  |  |
| Lycasin | 10.60% | 10.60% | 10.60% | 10.60% |
| Menthol | 3.91% | 3.91% | 3.91% | 3.91% |
| Aspartame | 0.05% | 0.05% | 0.05% | 0.05% |
| Sucralose | 0.02% | 0.02% | 0.02% | 0.02% |
| Color: (indicator device) Brilliant Blue (Sensient) | 0.02% | 0.02% | 0.02% | 0.02% |
| Center Weight | 1.126 g | 1.124 g | 1.204 g | 1.154 g |

TABLE 2

Composition of further chewing gum cores (Weight and weight-% based on total weight)

|  | Trial 1 Mannitol Center | Trial 2 Maltitol Center | Trial 3 Isomalt Center | Trial 4 Sorbitol Center |
|---|---|---|---|---|
| Gum Base *Navia* | 30.00% | 30.00% | 30.00% | 30.00% |
| Isomalt ST/PF |  |  | 40.00% |  |
| Sorbitol powder | 15.40% | 15.40% | 15.40% | 55.40% |
| Maltitol powder |  | 40.00% |  |  |
| Mannitol powder | 40.00% |  |  |  |
| Lycasin | 10.60% | 10.60% | 10.60% | 10.60% |
| Menthol | 1.50% | 1.50% | 1.50% | 1.50% |
| Peppermintoil | 2.41% | 2.41% | 2.41% | 2.41% |
| Aspartame | 0.05% | 0.05% | 0.05% | 0.05% |
| Sucralose | 0.02% | 0.02% | 0.02% | 0.02% |
| Color: (indicator device) Brilliant Blue (Sensient) | 0.02% | 0.02% | 0.02% | 0.02% |
| Center Weight | 1.126 g | 1.124 g | 1.204 g | 1.154 g |

Trial 3 represents the chewing gum core of the present invention, while trials 1, 2 and 4 are comparative examples.
Sorbitol particles: 90%<100 µm
Isomalt particles: Isomalt ST/PF (90%<100 µm)

The gum base, the maltitol syrup (Lycasin) and a part of the isomalt particles, the sorbitol particles, maltitol and mannitol, if applicable, were thoroughly mixed in a kneader for 30 minutes. Subsequently menthol, peppermint oil, the colouring, aspartame and sucralose and the remaining part of the above identified sweeteners were added. The mixture was subsequently thoroughly kneaded for 30 minutes. The amount of the compounds fed into the kneader corresponds to the recipes given in Table 2.

The kneading was performed at 50° C.

B) Coating Recipe:

TABLE 3

Composition of coating Standard Isomalt GS Coating

| Isomalt GS | 65.00% |
|---|---|
| Water | 29.80% |
| Gum Arabic Sol. (50%) | 4.10% |
| Titaniumdioxide | 1.00% |
| Aspartame | 0.05% |
| Acesulfame K | 0.05% |

Working temperature 55° C.

C) Coating Process

TABLE 4

Process phases
Powder: Isomalt ST/PF 750 g
Amount of Centers: 7 kg

|  | Number of cycles | Syrup addition/cycle | Powder addition/cycle |
|---|---|---|---|
| Phase 1 | 1 |  |  |
| Phase 2 | 1 | 120 g | 120 g |
| Phase 3 | 7 | 90 g | 90 g |
| Phase 4 | 38 | 90-100 g |  |
| Phase 5 | 5 | 70 g |  |
| Phase 6 | 2 | 60 g |  |
| Phase 7 | 1 | 50 g |  |
| Phase 8 |  | Waxing (without air) |  |
| Phase 9 |  | Waxing (with air) |  |

Chewing gum centers are provided in the coating drum (Driacoater 500/600). The coating solution (cf. B) is applied to the chewing gum centers at 55° C., wherein during said coating isomalt ST/PF (powder, 90% of the particles<100 μm) is added as powdery dry charges in phase 2 and phase 3. The applied coating layers are dried after each cycle with a constant air stream (approximately 25° C., <20% relative humidity). After finishing the application of the syrup the dragees are subjected to a waxing step.

TABLE 5

| | Process conditions | | | |
|---|---|---|---|---|
| | Trial 1 Mannitol Center | Trial 2 Maltitol Center | Trial 3 Isomalt Center | Trial 4 Sorbitol Center |
| Process time | 243 min | 240 min | 182 min | 182 min |
| Layer thickness | 33.9% | 34.4% | 34.0% | 34.2% |

Example 2

Determination of Chewing Gum Characteristics
Analysis of Menthol in the Coating of the Dragees:
The menthol migration from the core into the coating was measured as follows:
One chewing gum dragee is placed in a beaker glass containing 10 mL of water and the mixture is shaken for 30 s. Subsequently the liquid phase is subjected to GC/SPME analysis (solid phase micro extraction) on menthol. Thereby the menthol of the liquid phase is adsorbed at a SPME-fiber, afterwards transferred and desorbed in the injection system of a gas chromatograph (Agilent GC 6890), where the analysis is carried out. Quantification of menthol is carried out according the method of the internal standard (3-pentanol).

Figure 2:
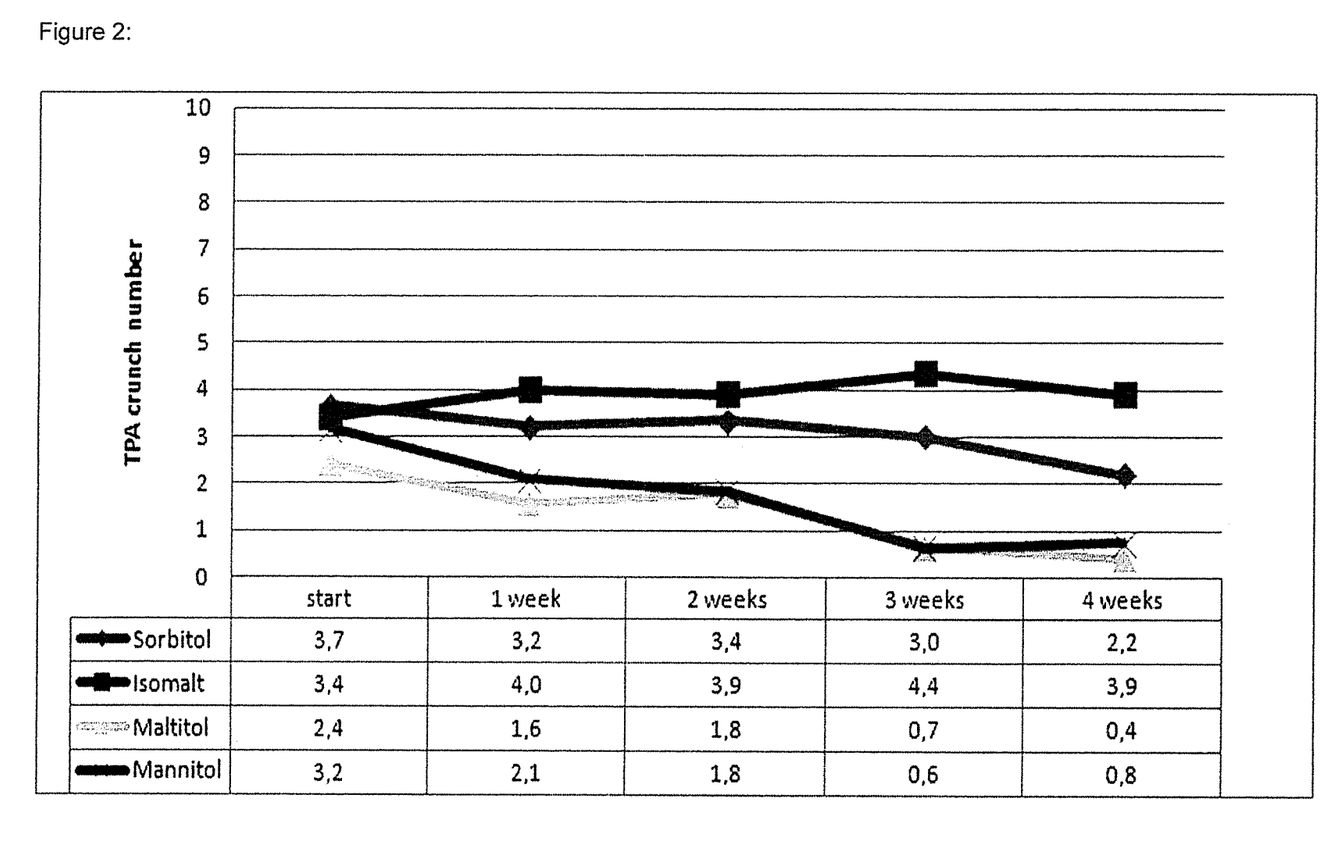
FIG. 2 shows graphically the TPA crunch number for the inventive chewing gum and three comparative examples.
Figure 3:
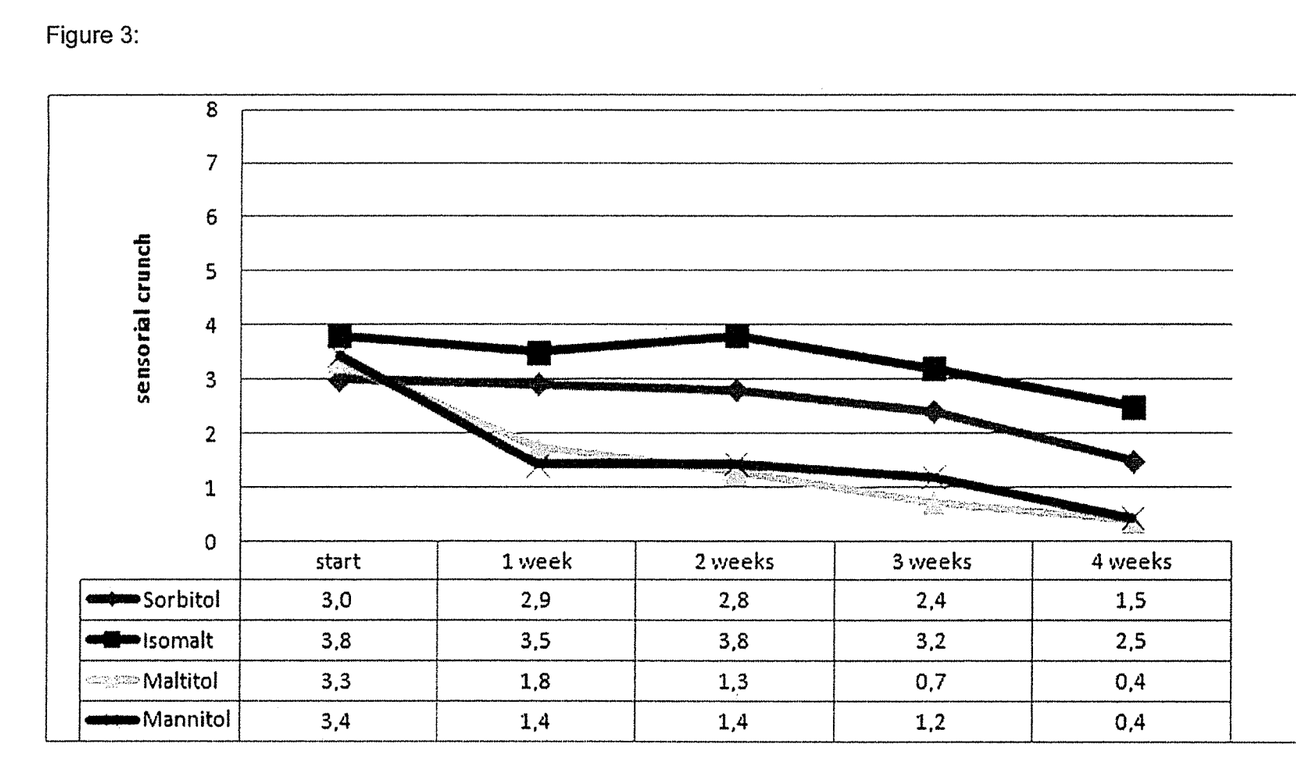
FIG. 3 shows graphically the sensorial crunch of the inventive chewing gum and the three comparative examples.
Figure 4:
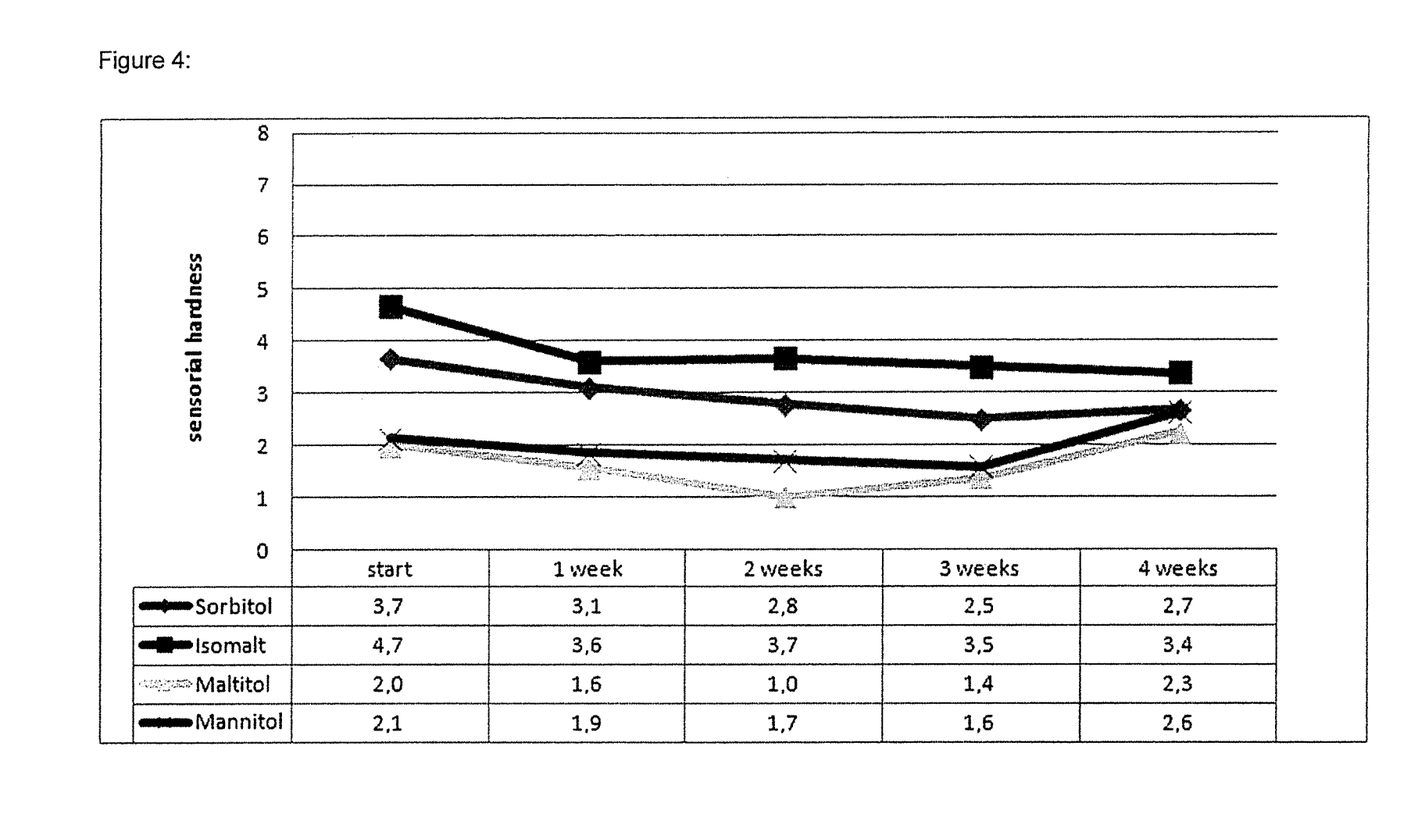
FIG. 4 shows graphically the sensorial hardness of the inventive chewing gum and three comparative examples.
Figure 5:
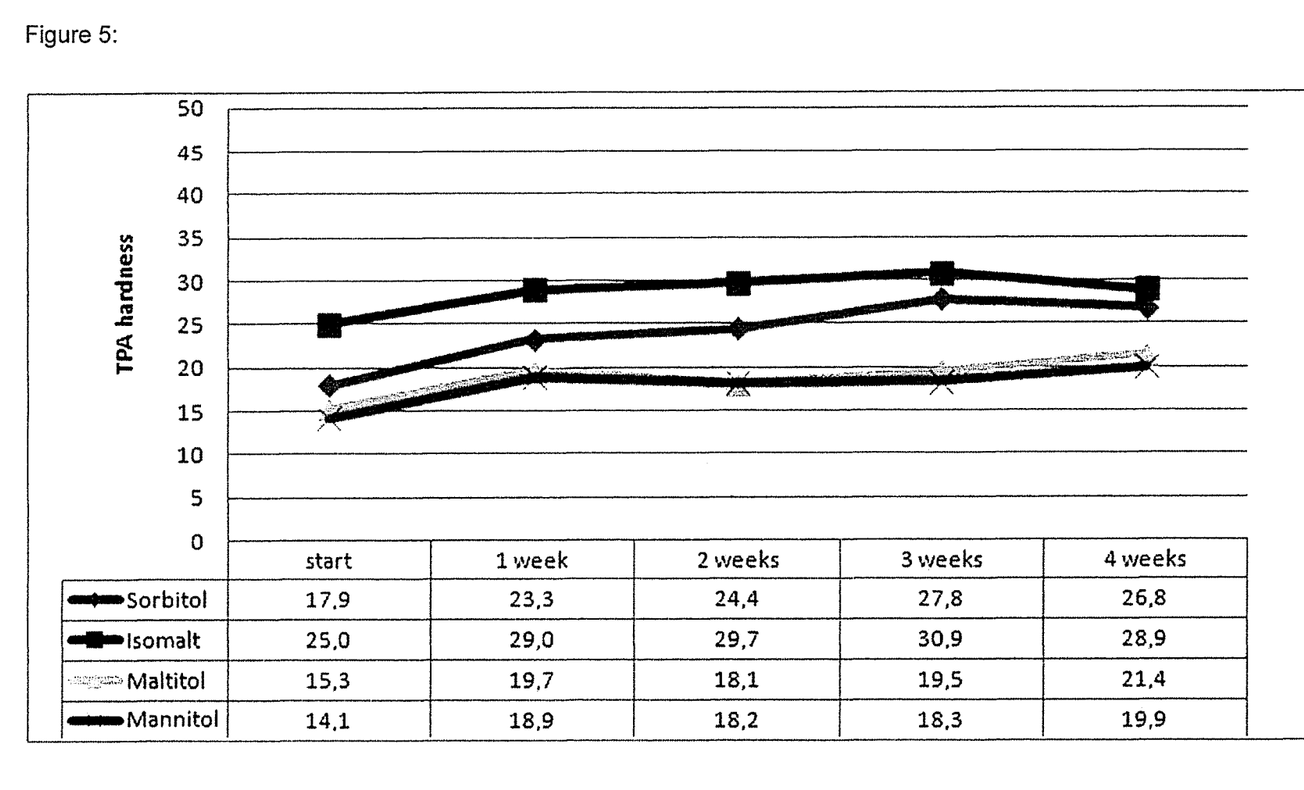
FIG. 5 shows graphically the TPA hardness of the inventive chewing gum and three comparative examples.
Figure 6:
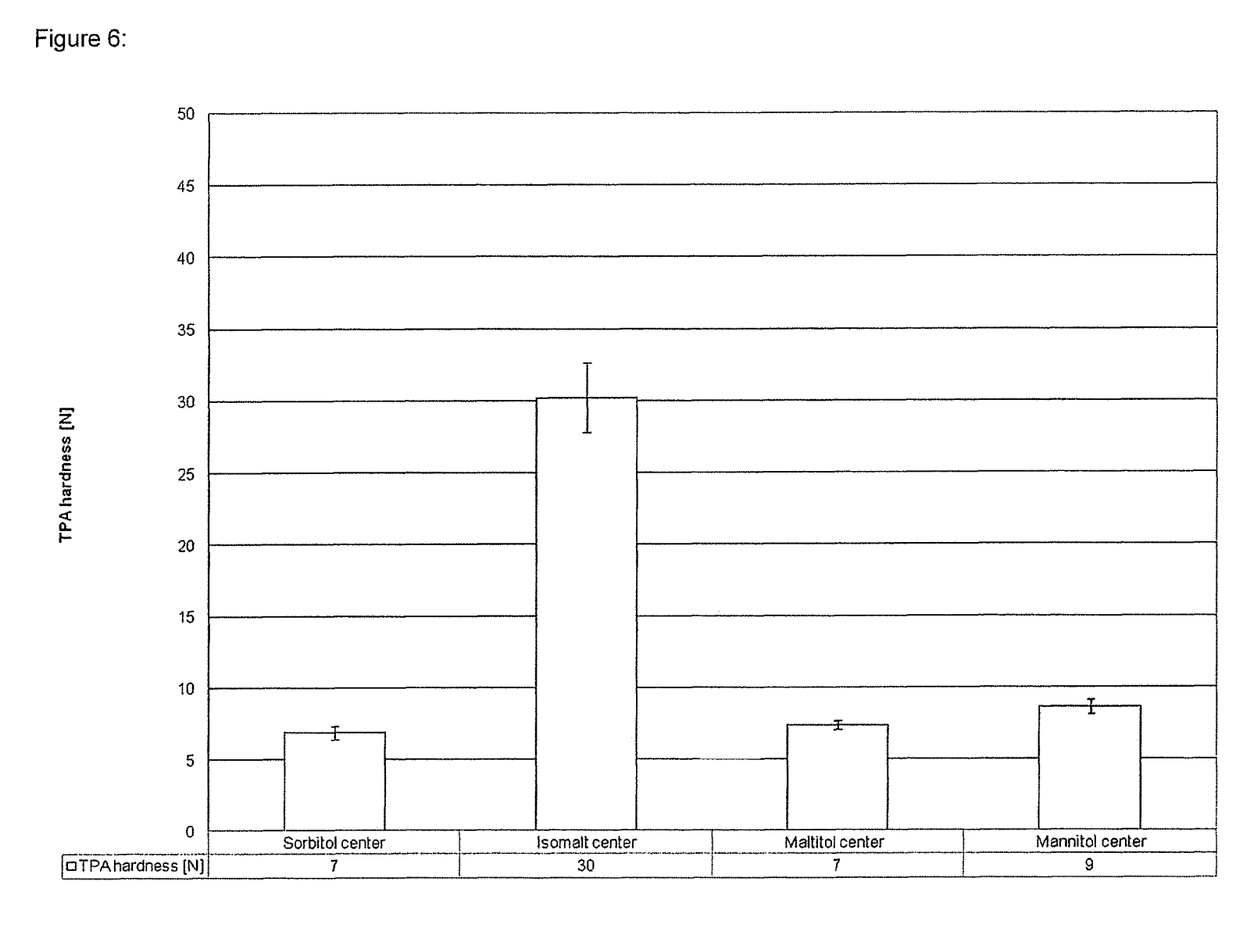
FIG. 6 shows graphically the TPA hardness of the inventive chewing gum core and three comparative examples and FIG. 7 illustrates the colour changes during storage tests for the inventive chewing gum and three comparative examples.

TPA Analysis of Hardness and Crunch Number:
The TPA crunch number and the hardness were determined as follows:
Texture profile analysis (TPA) is carried out using the texture analyzer TA-XT from Stable Micro Systems.
Measurement Parameters:
measuring cell: 50 kg
probe: cylinder P/5 (diameter 5 mm)
probe distance: 3 mm
forward speed: 0,1 mm/s
test speed: 0,1 mm/s
backward speed: 5 mm/s
threshold value: 0,06 N
Evaluation:
Hardness=max. peak of the graph [N]
Crunch number=Σ Peaks (t1 to (t1+10 s))>threshold 0.06 N
  t1=time of first breaking of the coating
The measurement results mentioned in the FIGS. 2, 5 and 6 are mean values calculated from the measurement of 20 samples.
The sensorial crunch and hardness of the chewing gum dragees was determined as follows:
Sensorial Evaluation of Chewing Gum
Sensorial evaluation of chewing gums (hardness and crunchiness) were carried out by a panel of 15 trained judges according to a descriptive examination with scale. The attributes were rated from 0 (not detectable) till 8 (extremely strong) and statistically evaluated.
Attributes Dragees:
Crunchiness: Overall impression at the first bite; Noise and harshness when crushing the product
Hardness: Hardness of the total product at first bite.
The results are shown in the FIGS. 3 and 4.

Example 3

Figure 1:
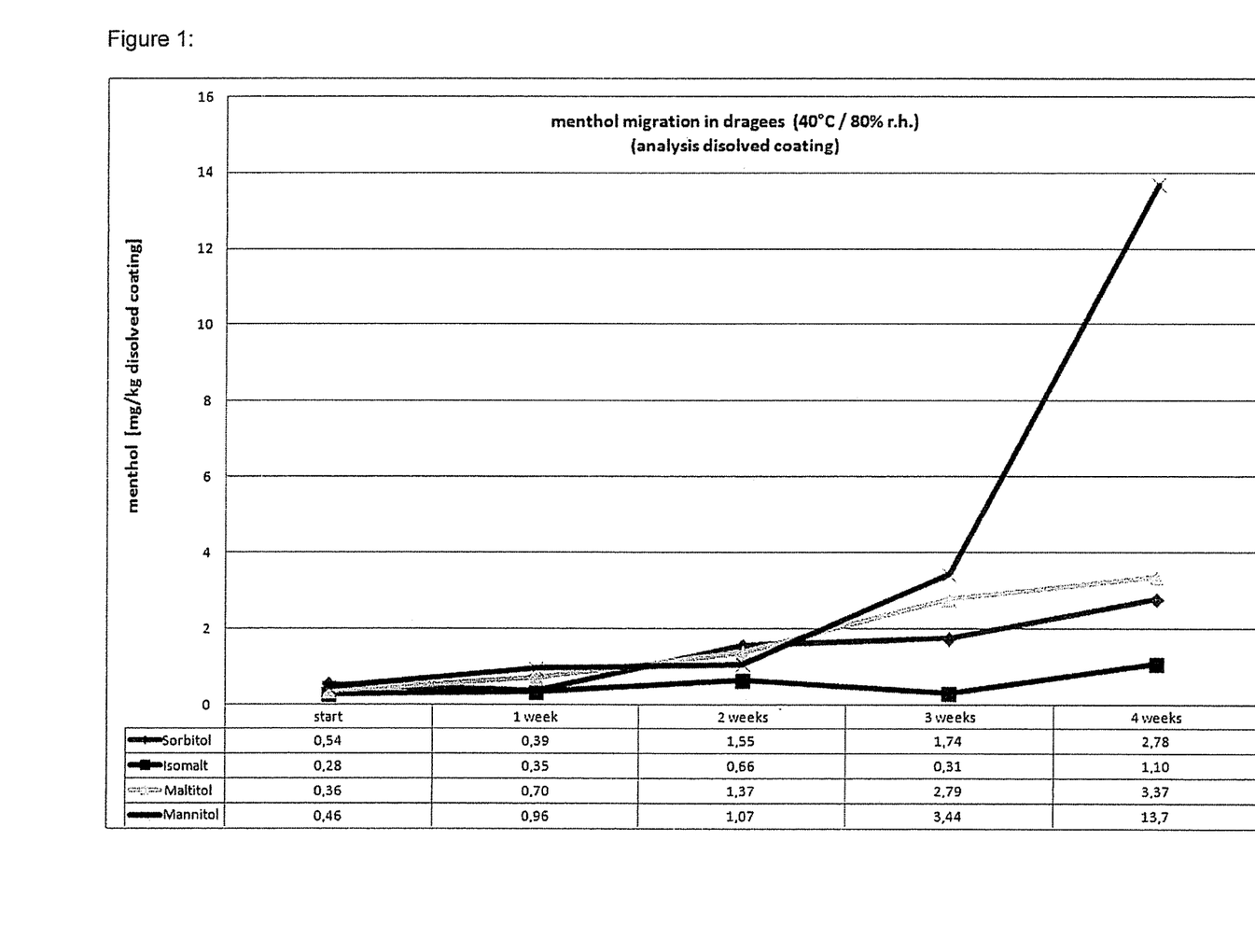
FIG. 1 shows graphically menthol migration from the core into the coating for the inventive chewing gum and three comparative examples.
Figure 7:
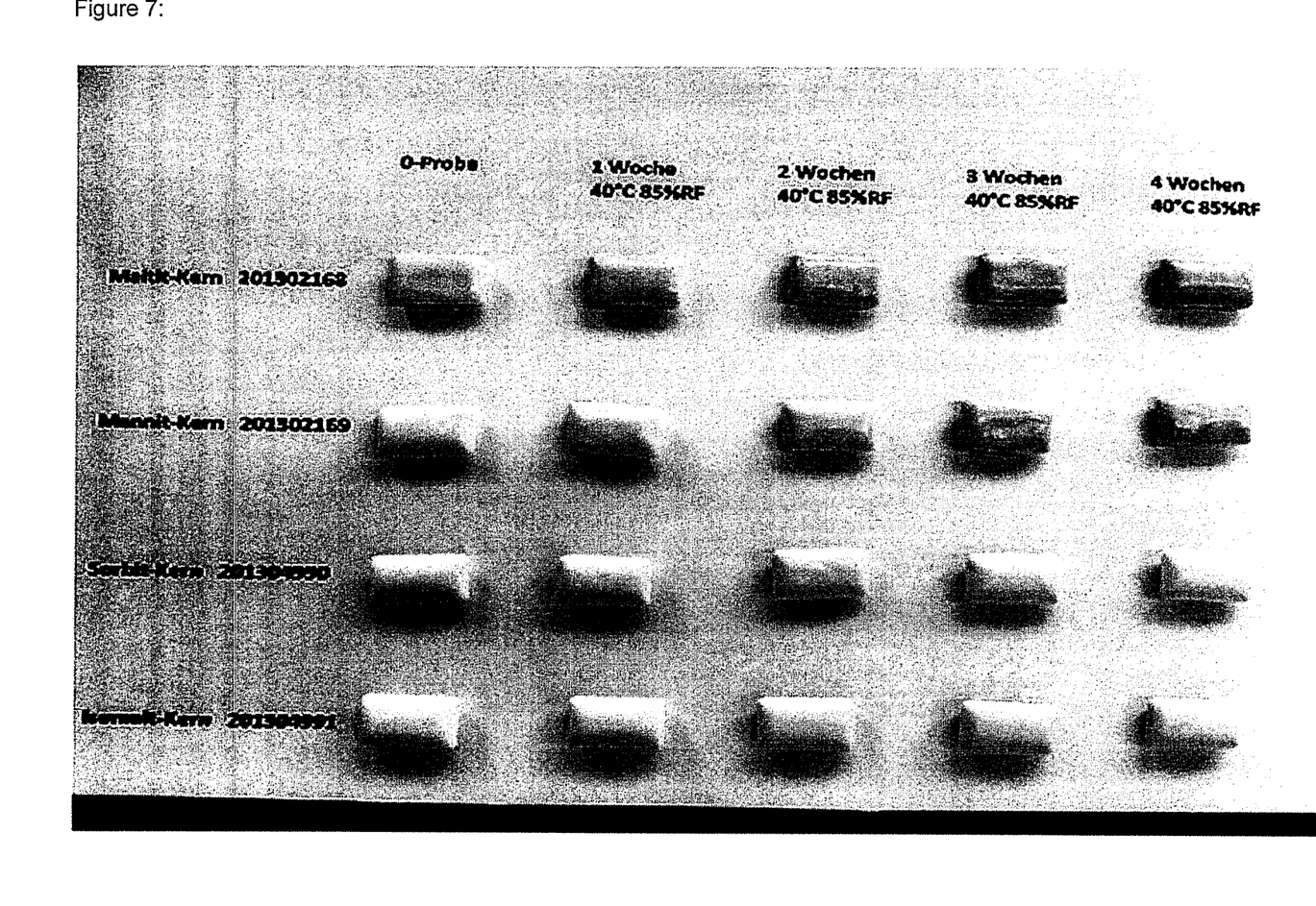

Results:
FIG. 1 shows that the three comparative coated chewing gums of trials 1, 2 and 4 exhibit a high menthol migration from the core into the coating. In contrast, the coated chewing gum of the present invention, namely the chewing gum dragee of trial 3, shows hardly any menthol migration into the coating.
FIGS. 2 to 5, which show the TPA crunch number and sensorial crunch as well as the sensorial and TPA hardness of the three comparative coated chewing gums (dragees) and the coated chewing gum (dragee) of the invention illustrate that both, the TPA and sensorial crunch as well as the TPA and sensorial hardness of the present inventive chewing gum is superior over the comparative examples.
FIG. 6 shows that the TPA hardness of the chewing gum core of the present inventive chewing gum dragee is superior over the TPA hardness of the chewing gum core of the comparative examples.
FIG. 7 shows the colour changes during a four weeks storage, tested under 85% relative humidity at 40° C. Accordingly, the product of trial 3, namely the product of the present invention, shows hardly any decolouration, which is in contrast to the three comparative examples.

What is claimed is:
1. A coated sugar- and glycerol-free chewing gum comprising a core and a coating, wherein the core comprises:
  a) at least one chewing gum base,
  b) at least one monoterpene, and
  c) a sweetener system comprising:
    c 1) hydrogenated starch hydrolysate, wherein the hydrogenated starch hydrolysate is present in the core in an amount of 5 to 20 wt.-% (based on total weight),
    c 2) isomalt particles, wherein at least 90 wt.-% of the particles have a particle size less than 100 μm, and wherein the isomalt particles are present in the core in an amount of 20 to 60 wt.-% (based on dry substance of the core),
    c 3) sorbitol particles, wherein the sorbitol particles are present in the core in an amount from 9 to 30 wt.-% (based on dry substance of the core), and
    c 4) at least one high intensity sweetener and/or a sweetness enhancer,
  wherein said sweetener system is the only component present in the core that provides sweetness,
  wherein the wt.-% ratio of the isomalt particles to the at least one monoterpene in the core is from 6:1 to 20:1, of the overall amount of the isomalt particles and the sorbitol particles to the hydrogenated starch hydrolysate in the core is from 4:1 to 6:1 and of the isomalt particles to the sorbitol particles in the core is from 2.2:1 to 2.8:1 (each wt.-% ratio based on total weight),
  wherein the coating comprises at least 80 wt.-% isomalt (based on dry substance of the coating); and
  wherein less than 2 mg/kg of the at least one monoterpene migrates into the coating after a period of 4 weeks.
2. The coated chewing gum according to claim 1, wherein the at least one monoterpene is at least one monocyclic monoterpene.
3. The coated chewing gum according to claim 2, wherein the monocyclic monoterpene is menthol.
4. The coated chewing gum according to claim 1, wherein the hydrogenated starch hydrolysate is maltitol syrup.

5. The coated chewing gum according to claim 1, wherein the chewing gum comprises 20 to 45 wt.-% coating and 55 to 80 wt.-% core (each based on dry substance of the chewing gum).

6. The coated chewing gum according to claim 1, wherein the wt.-% ratio of the isomalt particles to the sorbitol particles in the core is 2.5:1 (based on dry substance of the core).

7. The coated chewing gum according to claim 1, wherein the monoterpene is present in the chewing gum in form of corn mint oil, peppermint oil or mint oil.

8. The coated chewing gum according to claim 1, wherein the core, the coating or both comprises at least one additive selected from the group consisting of a hydrocolloid, gum arabic, a lubricant, a vitamin, a mineral, a pharmaceutically active ingredient, a preservative, a colour, $TiO_2$ and an edible acid.

9. The coated chewing gum according to claim 1, wherein the coating comprises at least one high intensity sweetener and/or sweetness enhancer.

10. The coated chewing gum according to claim 1, wherein the high intensity sweetener is aspartame, acesulfame K, sucralose, saccharine, glycyrrhicine, thaumatin, neohesperidin-dihydrochalkone, cyclamate, a *stevia* extract, steviol glycoside, stevioside, rebaudioside A, monellin or alitame.

11. The coated chewing gum according to claim 1, wherein the at least one monoterpene is menthol and the sweetener system consists of maltitol syrup, an equimolar mixture of 1,6-GPS and 1,1-GPM, sorbitol particles and at least one high intensity sweetener and/or sweetness enhancer.

12. The coated chewing gum according to claim 11, wherein the coating comprises at least 80 wt.-% of a mixture of 71 to 79% 1,6-GPS and 29 to 21% 1,1-GPM.

13. A method for the production of a coated sugar- and glycerol-free chewing gum according to claim 1, which comprises the steps of i) providing a chewing gum core comprising components a) to c), ii) providing a coating medium comprising a solvent and isomalt, iii) applying the coating medium to the chewing gum core, so as to obtain at least one coating layer on the core, iv) evaporating the solvent from the at least one coating layer and v) obtaining the coated chewing gum, wherein the coating comprises at least 80 wt.-% isomalt (based on dry substance of the coating).

14. The method of claim 13, wherein the isomalt is a mixture of 71 to 79% 1,6-GPS and 29 to 21% 1,1-GPM.

15. A coated sugar- and glycerol-free chewing gum comprising a core and a coating, wherein the core comprises:
  a) at least one chewing gum base,
  b) at least one monoterpene, and
  c) a sweetener system consisting of:
    c 1) hydrogenated starch hydrolysate, wherein the hydrogenated starch hydrolysate is present in the core in an amount of 5 to 20 wt.-% (based on total weight),
    c 2) isomalt particles, wherein at least 90 wt.-% of the particles have a particle size less than 100 μm, and wherein the isomalt particles are present in the core in an amount of 20 to 60 wt.-% (based on dry substance of the core),
    c 3) sorbitol particles, wherein the sorbitol particles are present in the core in an amount from 9 to 30 wt.-% (based on dry substance of the core), and
    c 4) at least one high intensity sweetener and/or a sweetness enhancer,
  wherein said sweetener system is the only component present in the core that provides sweetness,
  wherein the wt.-% ratio of the isomalt particles to the at least one monoterpene in the core is from 6:1 to 20:1, of the overall amount of the isomalt particles and the sorbitol particles to the hydrogenated starch hydrolysate in the core is from 4:1 to 6:1 and of the isomalt particles to the sorbitol particles in the core is from 2.2:1 to 2.8:1 (each wt.-% ratio based on total weight),
  wherein the coating comprises at least 80 wt.-% isomalt (based on dry substance of the coating), and
  wherein, after a period of 4 weeks, less than 2 mg/kg of the at least one monoterpene migrates into the coating and the coated sugar- and glycerol-free chewing gum has a texture profile analysis (TPA) crunch number that is not lower than an initial TPA crunch number when the coated sugar- and glycerol-free chewing gum is made.

16. A chewing gum comprising:
a core comprising:
  a) a chewing gum base,
  b) a monoterpene, and
  c) a sweetener system consisting of:
    c 1) hydrogenated starch hydrolysate at a concentration of 8 to 15 wt.-% (based on total weight),
    c 2) isomalt particles at a concentration of 36 to 44 wt.-% (based on dry substance of the core), the isomalt particles having a particle size less than 100 μm,
    c 3) sorbitol particles at a concentration of 11 to 19 wt.-% (based on dry substance of the core), the sorbitol particles having a particle size less than 100 μm, and
    c 4) at least one of a high intensity sweetener or a sweetness enhancer at a concentration of 0.01 to 0.08 wt.-% (based on dry substance of the core),
  wherein the sweetener system is the only component present in the core that provides sweetness; and
a coating comprising at least 80 wt.-% isomalt (based on dry substance of the coating),
wherein, after a period of 4 weeks, less than 2 mg/kg of the monoterpene migrates into the coating and the chewing gum has a texture profile analysis (TPA) crunch number that is not lower than an initial TPA crunch number when the chewing gum is made, and
wherein the chewing gum is sugar-free and glycerol-free.

17. The chewing gum according to claim 16, wherein:
the core comprises 1.5 to 3.91 wt.-% menthol,
the sweetener system consists of about 10.6 wt.-% maltitol syrup, about 40 wt.-% isomalt, about 15.4 wt.-% sorbitol, about 0.05 wt.-% aspartame, and about 0.02 wt.-% sucralose, and
the coating comprises about 65 wt.-% isomalt (based on the total weight of the coating), about 30 wt.-% water, and about 4 wt.-% gum arabic.

* * * * *